United States Patent [19]

Wertheimer et al.

[11] Patent Number: 4,599,678
[45] Date of Patent: Jul. 8, 1986

[54] PLASMA-DEPOSITED CAPACITOR DIELECTRICS

[76] Inventors: Michael R. Wertheimer, 91 Sommerville Ave., Westmount, Quebec, Canada, H3Z 1J4; Tyamagondlu S. Ramu, No. 172, 2nd Main, 3rd Cross, "Srividya", Mahalaxmi Layout, Bangalore 560086, India

[21] Appl. No.: 713,638

[22] Filed: Mar. 19, 1985

[51] Int. Cl.⁴ .................. H01G 4/08; H01L 29/12; B32B 9/04
[52] U.S. Cl. .............................. 361/323; 252/62.3 Q; 428/447
[58] Field of Search ................. 252/62.3 Q; 361/273, 361/323; 428/391, 447

[56] References Cited

U.S. PATENT DOCUMENTS

| | | |
|---|---|---|
| 3,333,169 | 7/1967 | Valley ........................ 361/323 X |
| 3,619,259 | 11/1971 | Wright et al. .................... 361/323 |
| 3,806,775 | 4/1974 | Edman ........................ 361/323 X |
| 3,814,983 | 6/1974 | Weissfloch et al. ............ 315/3.5 X |
| 4,072,976 | 2/1978 | Harari ........................ 361/273 X |
| 4,156,887 | 5/1979 | Tanguy ........................ 361/323 X |
| 4,431,701 | 2/1984 | Hamada et al. ................ 428/391 X |
| 4,543,294 | 9/1985 | Sakagami et al. ............. 361/323 X |

Primary Examiner—Donald A. Griffin

[57] ABSTRACT

A plasma-deposited silicon compound thin film dielectric for use in a thin film capacitor. The film is produced in a high frequency glow discharge with a substrate heated to a temperature in excess of 50° C. A thin film capacitor using such a film has a lower dissipation factor and a reduced tendency to age.

25 Claims, 12 Drawing Figures

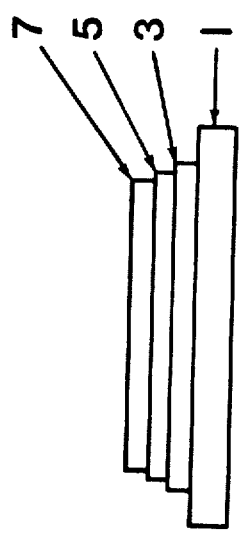

PLASMA-DEPOSITED CAPACITOR DIELECTRICS

BACKGROUND OF INVENTION

1. Field of the Invention

The invention relates to plasma-deposited silicon compound thin film dielectric materials produced in high frequency glow discharges. Thin film capacitors using such dielectric materials have an improved dissipation factor (tan δ) and a reduced tendency to age rapidly.

2. Description of Prior Art

The capacitance C of a parallel electrode condenser filled with a dielectric medium is given by the formula:

$$C = (\epsilon_o K' A / d)$$

where $\epsilon_o$ is the permittivity of free space,

K' is the relative permittivity of the dielectric,

A and d are the area and spacing of the electrodes, respectively.

Since C varies inversely with the thickness d of the dielectric, it is evidently advantageous to make the latter as thin as possible. In the case of most conventional solid dielectrics, a lower limit of thinness is imposed by the appearance of excessive numbers of voids and other defects in the dielectric which render it unsatisfactory below this lower limit. Plasma (or glow discharge) polymers, and other plasma-deposited thin films, constitute a class of synthetic insulating materials which can be prepared practically free of such defects. Consequently, it is felt that they hold promise as dielectrics for thin film capacitors.

However, as reported in: "Electrical Properties of Plasma-Polymerized Thin Organic Films," Plasma Chemistry and Plasma Processing, Vol. 3, No. 3, 1983, Gazicki and Yasuda, a summary of the electrical properties of such dielectric materials, there are indications that such promise has not been realized for two reasons: the dissipation factor (tan δ) of the polymerized dielectrics is generally much poorer than for conventional polymers; and there is a greater tendency for the polymerized dielectrics to age rapidly as compared to conventional polymers. The former is illustrated at Table I, page 282 of the reference.

It has now been surprisingly and unexpectedly found that the characteristics of plasma deposited thin films can be improved by carrying out the deposition on a substrate at elevated temperatures.

Teachings relating to microwave plasma-polymerization of organo-silicones using a heated substrate are found in: Polymerization of Organosilicones in Microwave Discharges. II. Heated Substrates, J. Macromol. Sci.-Chem., A15(2), pp. 197-213 (1981), Wrobel et al; Advances in Basic and Applied Aspects of Microwave Plasma Polymerization, Thin Solid Films, 115 (1984), pps. 109-124, Wertheimer et al, and Optical Properties of Plasma-Polymerized Organosilicone Films, Canadian Journal of Physics, Volume 60, Number 5, 1982, pps. 628-631, Wertheimer et al. The first disclosure of certain limited aspects of the invention herein was reported in the Conference Record of the 1984 IEEE International Symposium on Electrical Insulation, Montreal, June 11-13, 1984 at pages 167 to 170, Ramu et al.

SUMMARY OF INVENTION

It is an object of the invention to provide a plasma-deposited silicon compound thin film dielectric material produced in high frequency glow discharges for use in thin film capacitors.

It is a further object of the invention to provide such thin film materials which when used as dielectrics for thin film capacitors, provide such thin film capacitors having an improved dissipation factor and a reduced tendency to age rapidly.

In accordance with the invention, there is provided a plasma-deposited silicon compound thin film dielectric material produced in high frequency glow discharges with a heated substrate, the substrate being heated to a temperature exceeding 50° C. The film may be produced in a large volume microwave plasma (LMP) discharge as taught in the above references of Wertheimer et al and Wrobel et al and U.S. Pat. No. 3,814,983.

The dielectric film thickness may be between 100 and 100,000 Å.

In accordance with the invention, there is further provided a thin film capacitor including such a plasma-deposited silicon compound thin film dielectric material.

BRIEF DESCRIPTION OF DRAWINGS

The invention will be better understood by an examination of the following description, together with the accompanying drawings, in which:

FIG. 1 is a simplified illustration of a thin film capacitor with a dielectric formed in accordance with the invention;

DESCRIPTION OF PREFERRED EMBODIMENTS

Referring to FIG. 1, a thin film capacitor formed in accordance with the invention is formed on a substrate 1 made of a material such as glass. 3 is a first electrode which can be an aluminum electrode and 5 is the dielectric film formed in accordance with the invention. 7 constitutes the second electrode.

As above-mentioned, the process for plasma-polymerization of organo-silicone film dielectrics is described in J. Macromol Sci.-Chem. Wrobel et al, referred to above. The dielectric film is between 100 and 100,000 Å units and preferably between 1000 and 10,000 Å units, and the top electrode may be made thin enough, 100 to 1,000 Å units, to allow self-healing breakdowns.

Figures 2A, 2B:
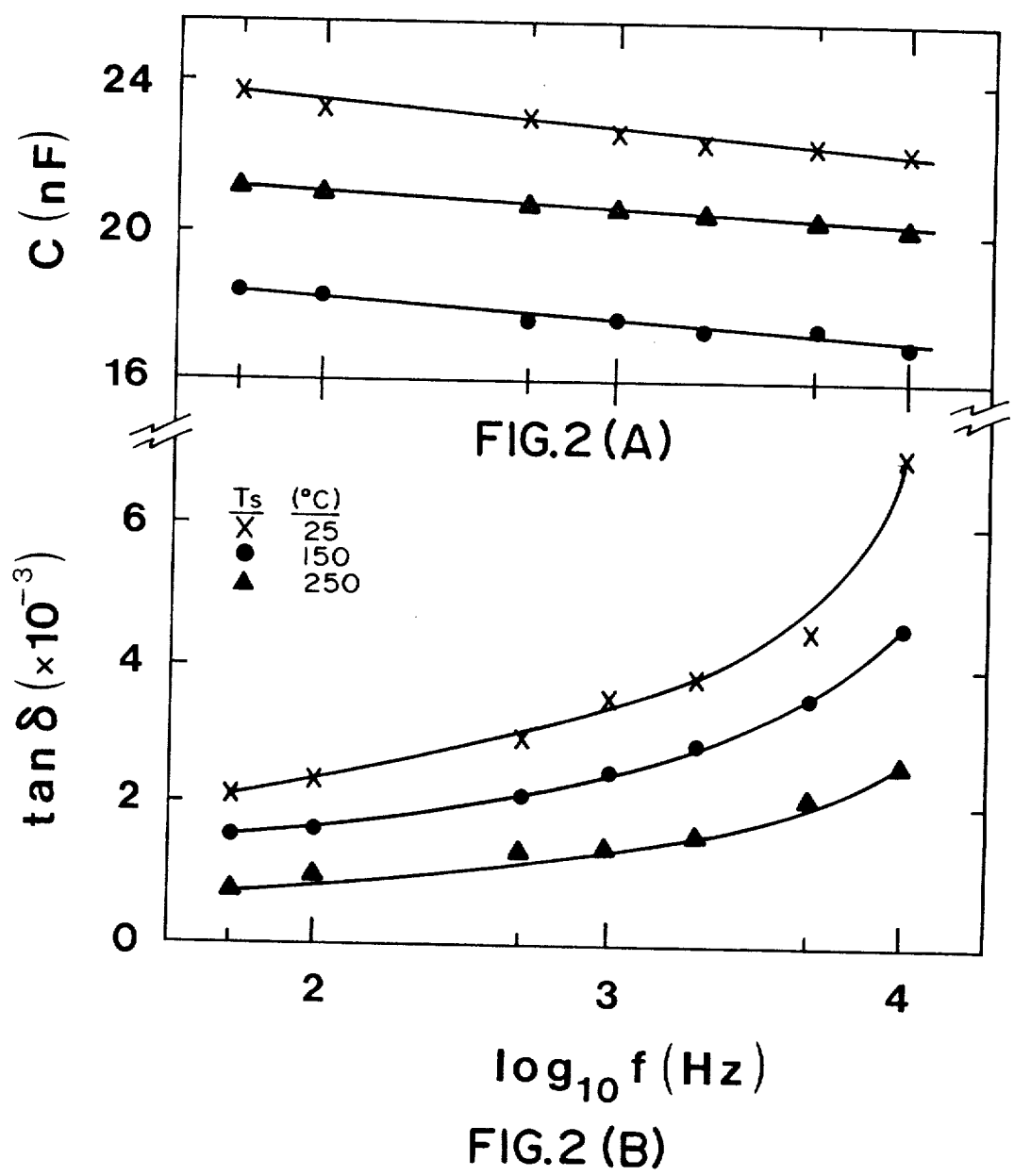
FIGS. 2A and 2B show measurements of the dielectric properties of capacitance and dissipation factor, respectively, of thin film capacitors with PPHMDSO film dielectrics as functions of measurement frequency, the films having been prepared at different substrate temperatures.
Figures 3A, 3B:
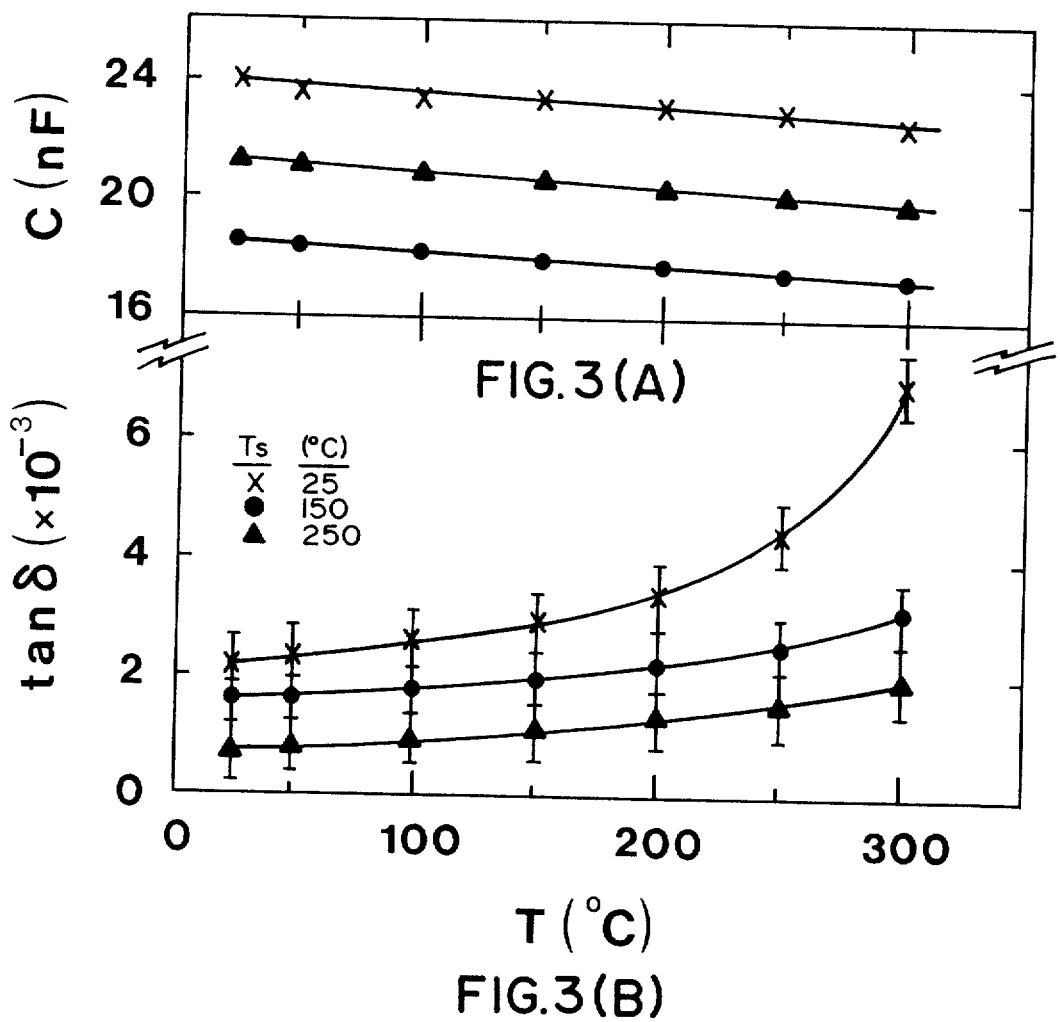
FIGS. 3A and 3B show measurements of the dielectric properties of capacitance and dissipation factor, respectively, of thin film capacitors with PPHMDSO film dielectrics as functions of measurement temperature, the films having been prepared at different substrate temperatures.

As seen in FIGS. 2A and 2B, and in FIGS. 3A and 3B, the dissipation factor of the film prepared on a substrate at 150° C. is better (lower) than the dissipation factor of films prepared at lower temperatures. In fact, the dissipation factor improves with an additional increase in the temperature of the substrate, as will be further confirmed below.

The capacitance is seen to vary very little with either frequency or temperature in thin film capacitors with dielectric films produced at a substrate temperature in excess of 50° C.

Figure 4:
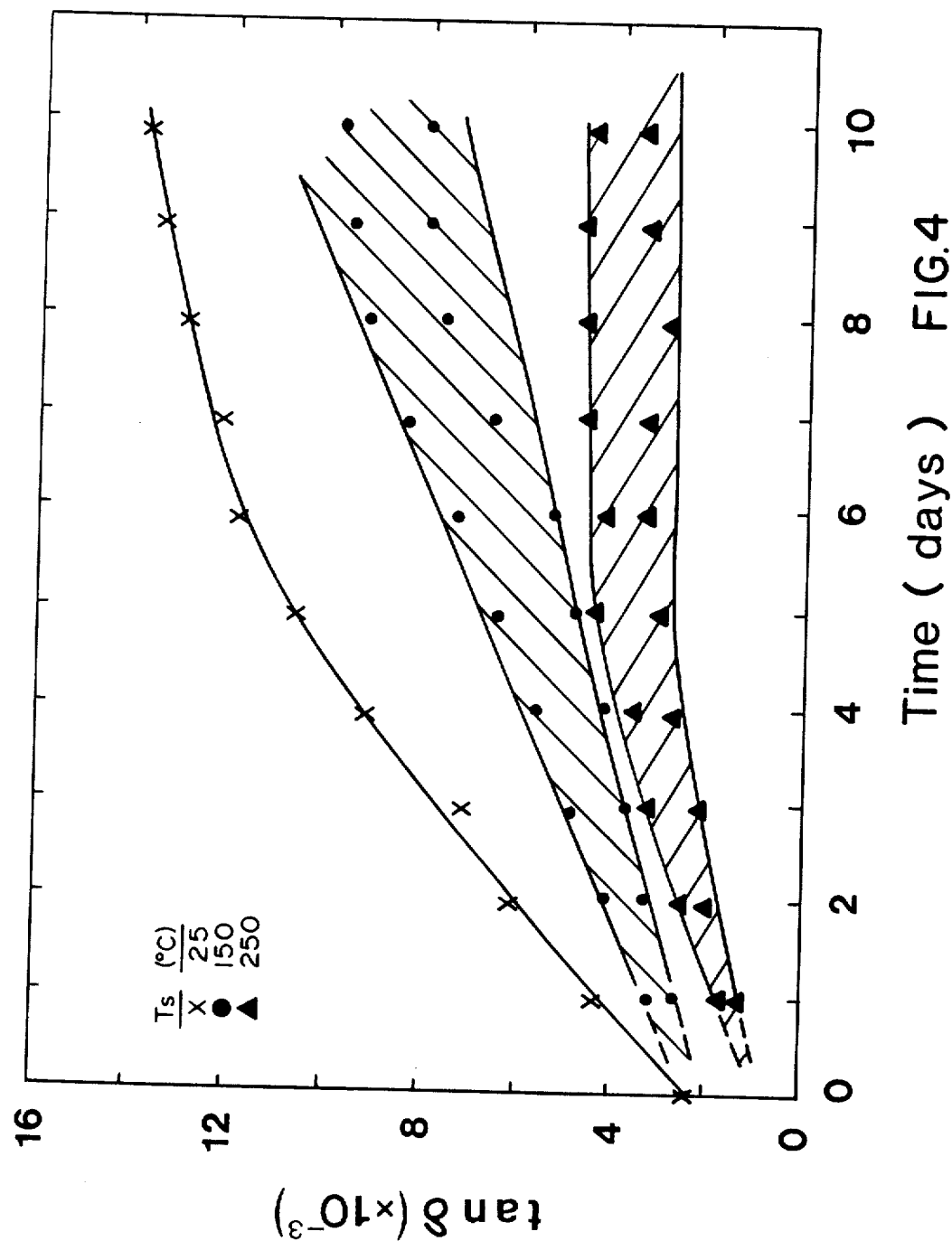
FIG. 4 illustrates how the dissipation factors of thin film capacitors with dielectric films prepared at different substrate temperatures evolve with time when the films are "aged" in air at 300° C.

As seen in FIG. 4, although there is a degradation (increase) of dissipation factor with time when the film is "aged" in air at 300° C., the degradation is not as significant with films produced at higher substrate temperatures as it is with films produced at lower substrate temperatures. Accordingly, there is a substantially reduced tendency for the films produced at higher substrate temperatures to age rapidly.

Figure 5A:
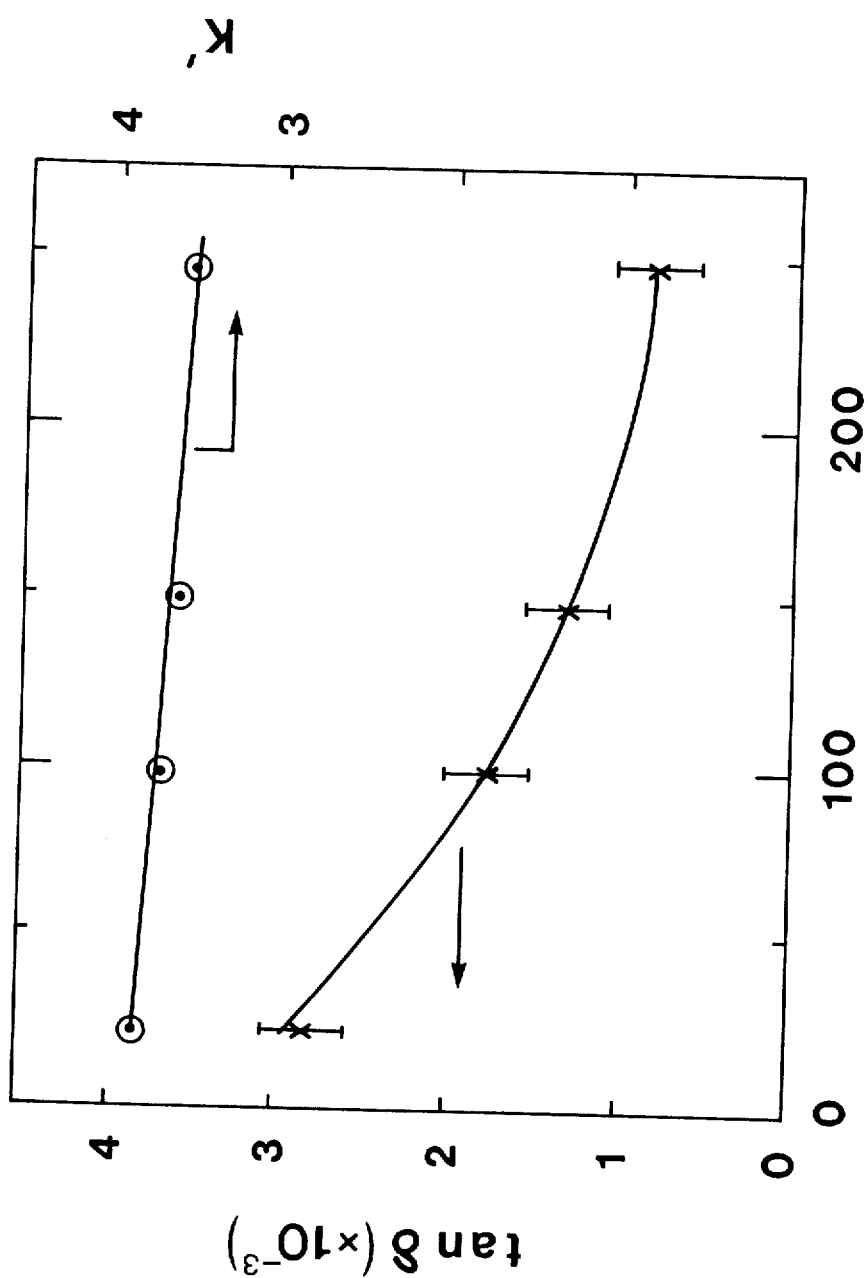
FIGS. 5A, 5B and C show, respectively, the effects of substrate temperature on dissipation factor and K' measured at 50 Hz, on dielectric withstand strength, and on the number of self-breakdown events per cm² of film surface.
Figure 5B:
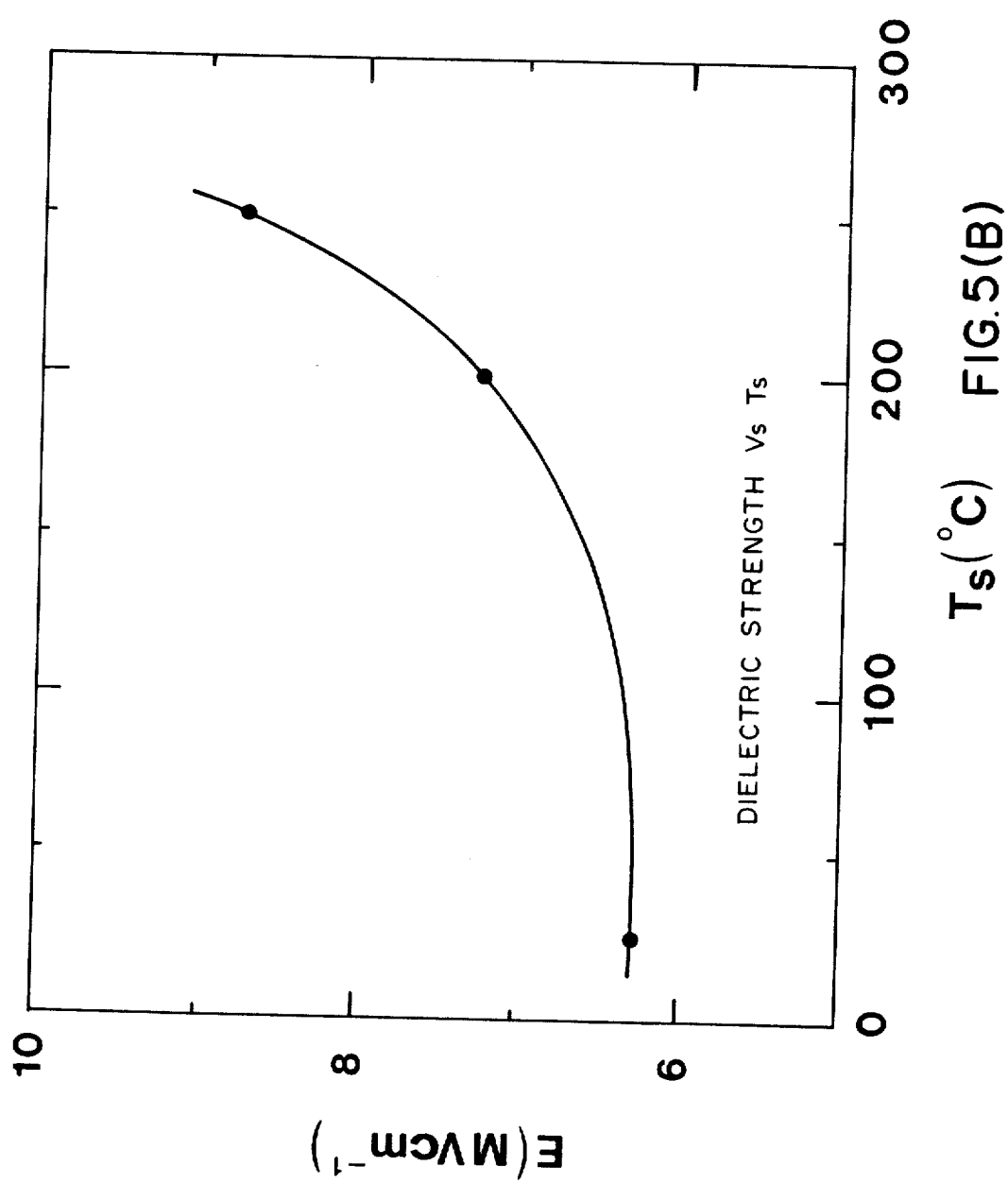
Figure 5C:
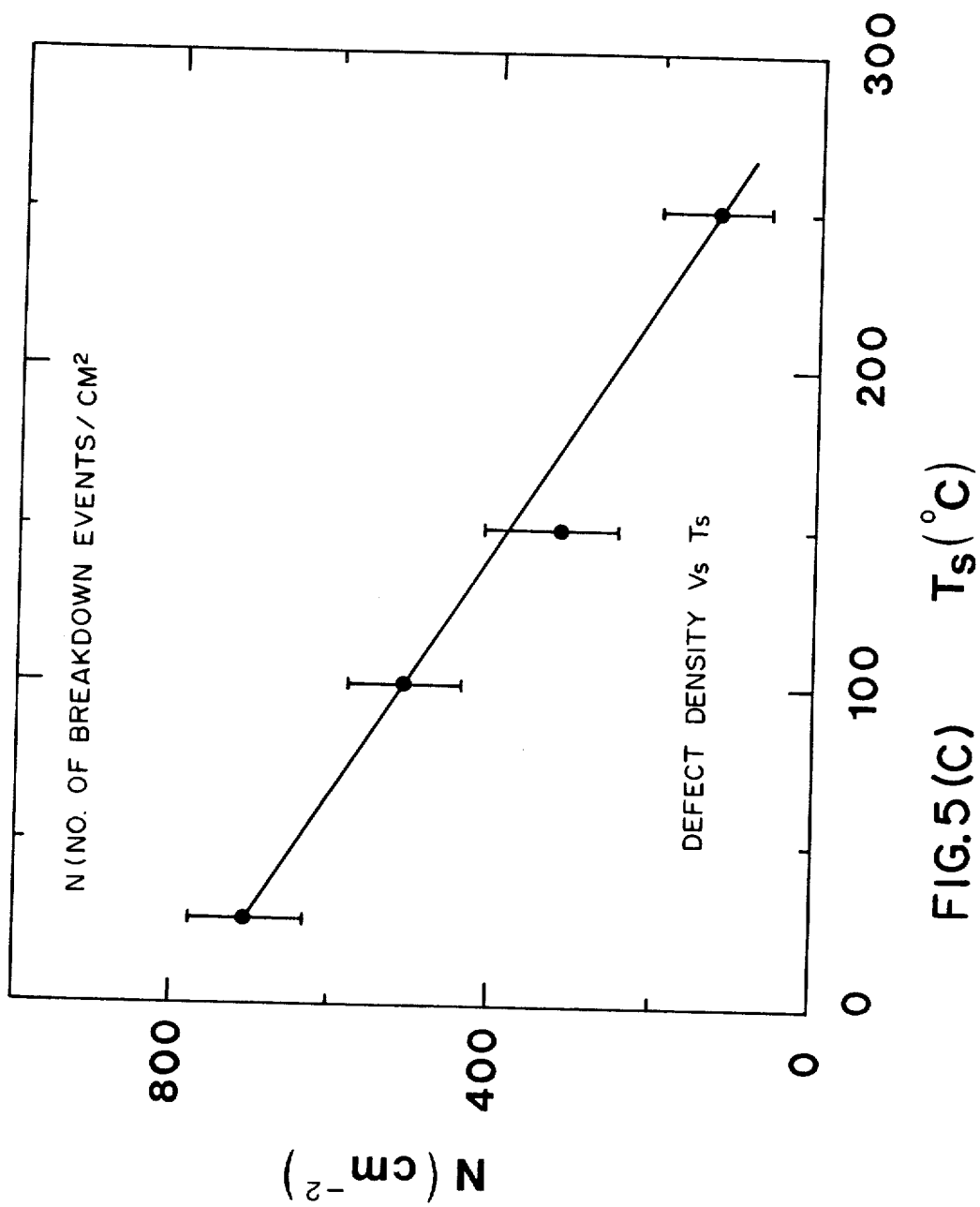

As seen in FIG. 5A, the dissipation factor improves dramatically with increase in substrate temperature. FIG. 5B illustrates a dramatic increase in dielectric strength with increase in substrate temperature, while FIG. 5C illustrates a dramatic decrease in defect density with increase in substrate temperature. Specifically, in FIG. 5B, the dielectric strength increases from just over 6 MV/cm at 25° C. to better than 8.5 MV/cm at 250° C. FIG. 5C illustrates a decrease from 600 breakdown events per $cm^2$ for a film produced with a substrate temperature of 25° C. to less than 150 breakdown events per $cm^2$ for a film produced at a substrate temperature of 250° C. The lowest value of tan $\delta$ is approximately $8 \times 10^{-4}$, again, for a film produced at a substrate temperature of 250° C.

Figure 6:
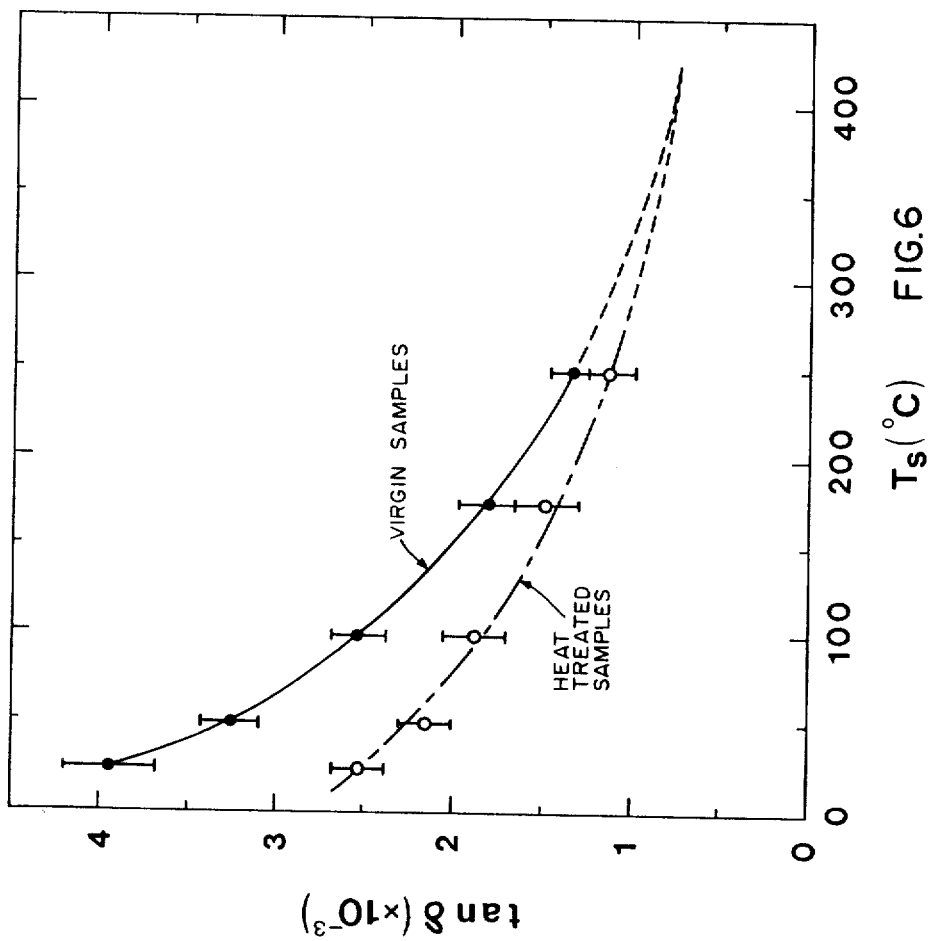
FIG. 6 shows the effect of heat treatment and substrate temperature on dissipation factor.

FIG. 6 illustrates the effect of heat treatment of the films. As can be seen, such heat treatment shows some improvement in the dissipation factor for films which have been prepared with a substrate temperature in the range of 50° to 250° C. It would appear that both types of film will reach an asymptote near 450° C.

Figure 7:
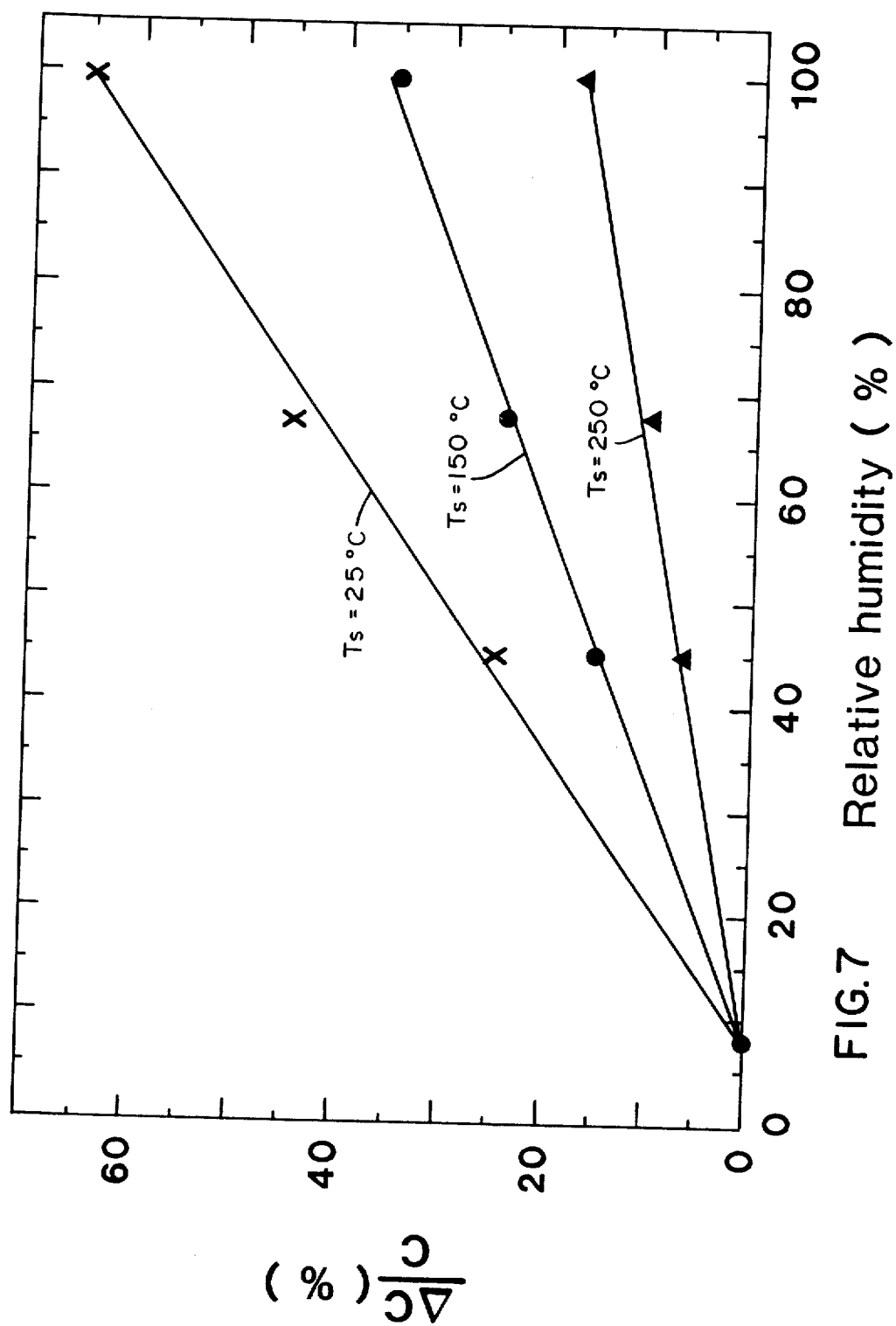
FIG. 7 illustrates a change in capacity versus relative humidity for films produced at different substrate temperatures.

The moisture uptake of the film, an important characteristic for a capacitor dielectric, is illustrated in FIG. 7 which illustrates that the rate of change of capacitance as a function of relative humidity decreases with an increase in substrate temperature. The capacitance coefficient of humidity ($\beta$) can be derived from these plots which are essentially linear. It is evident that $\beta$ is considerably lower (~0.19) at a substrate temperature of 250° C. compared to that for a film deposited at room temperature (25° C.). Thus, films deposited at elevated substrate temperatures are less prone to moisture absorption than those prepared at room temperature.

It can therefore be seen that the overall dielectric properties, and their stability, of plasma-polymerized hexamethyldisiloxane (PPHMDSO) films are greatly improved by adopting higher substrate temperatures during film deposition. Thus, the plasma-polymerized organo-silicones prepared under the above conditions provide advantages relative to dielectric films of the prior art.

Although the description refers only to HMDSO as a starting monomer, substantially any volatile organosilicone compound having adequate vapor pressure, for example, hexamethyldisilazane (HMDSN) could be used for this purpose. It is, of course, appreciated that HMDSO and HMDSN are just two useful examples of other (perhaps dozens) organosilicone compounds which could be used.

Figure 8:
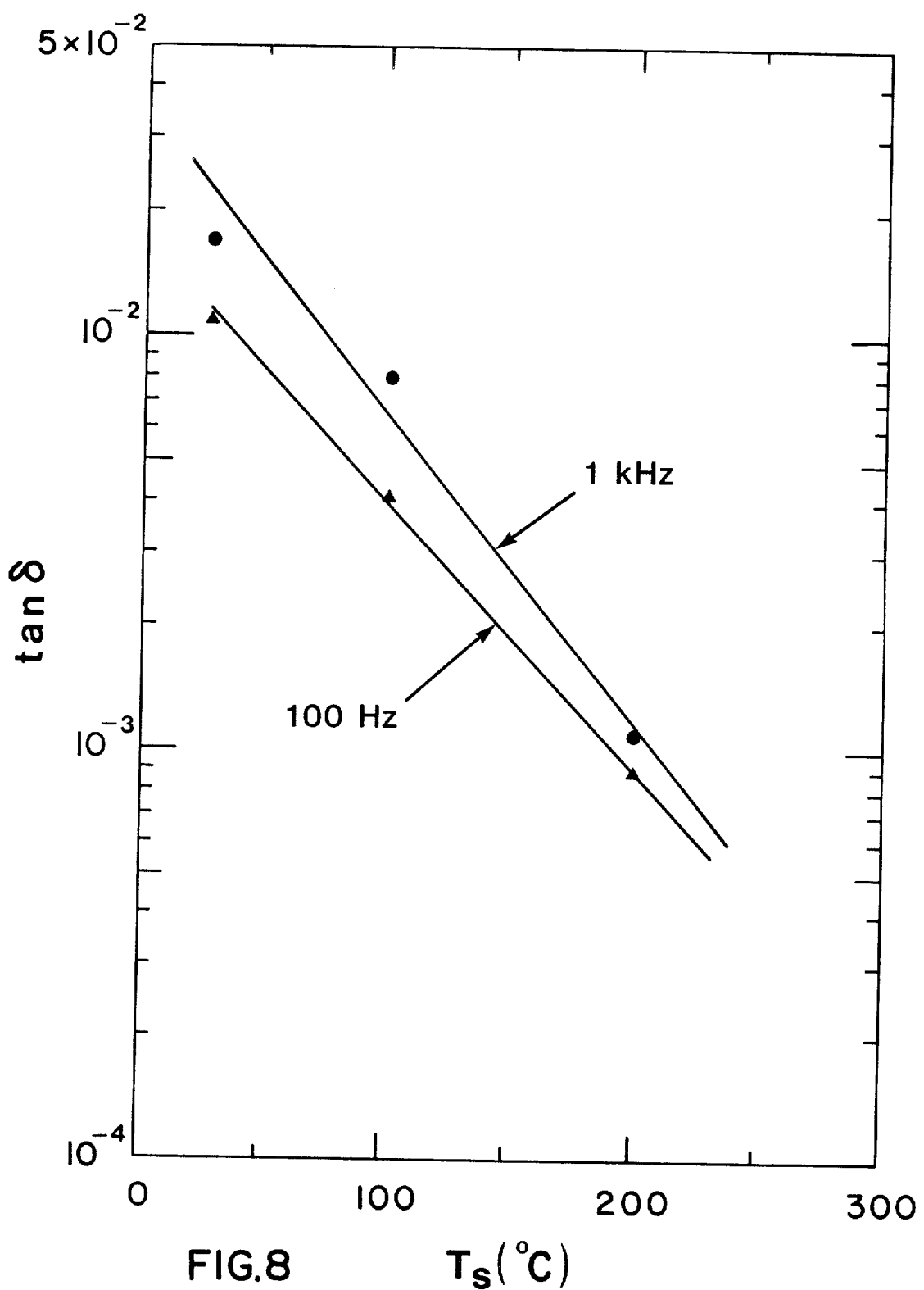
FIG. 8 shows reduction of dissipation factor with substrate temperature in thin film capacitors having silicon nitride dielectric films.

Similarly, inorganic silicon compounds such as, for example, silicon oxide ($SiO_2$), silicon nitride (SiN) and silicon oxy-nitride (SiON), prepared in glow discharges as taught herein above, could serve this purpose as is illustrated in FIG. 8 with respect to SiN. The films on which the FIG. 8 data were measured were prepared from mixtures of silane ($SiH_4$) and ammonia ($NH_3$). Silicon oxide films can be prepared by mixtures of $SiH_4$ and nitrous oxide ($N_2O$), whereas SiON films can be prepared by mixtures of $SiH_4$, $NH_3$, and $N_2O$.

Although a substrate temperature range of 50°-450° C. has been shown, the useful range of substrate temperatures is in excess of 50° C., specifically, 50° to 1000° C. The preferred range is between 100° and 650° C.

The deposition can be produced by glow discharges in a wide range of frequencies, for example, D.C. to 10 GHz. A preferred deposition frequency is the large volume microwave plasma (LMP) discharge frequency, that is, 2.45 GHz.

Although several embodiments have been described, this was for the purpose of illustrating, but not limiting, the invention. Various modifications, which will come readily to the mind of one skilled in the art, are within the scope of the invention as defined in the appended claims.

We claim:

1. A plasma-deposited silicon compound thin film dielectric material for use in a thin film capacitor, such film being produced in a glow discharge with a substrate heated to a temperature in excess of 50° C.

2. A dielectric film as defined in claim 1 wherein the deposition frequency of the glow discharge is 2.45 GHz.

3. A dielectric film as defined in claim 1 wherein said silicon compound comprises an organo-silicone.

4. A dielectric film as defined in claim 3 wherein said organosilicone comprises plasma-polymerized hexamethyldisiloxane (PPHMDSO).

5. A dieletric film as defined in claim 3 wherein said organosilicone comprises plasma-polymerized hexamethyldisilazane (PPHMDSN).

6. A dielectric film as defined in claim 5 wherein said inorganic silicon compound is selected from the group of silicon nitride, silicon oxide or silicone oxynitride.

7. A dielectric film as defined in claim 1 wherein said silicon compound comprises an inorganic silicon compound.

8. A plasma-deposited silicon compound thin film dielectric material for use in a thin film capacitor, such film being produced in a glow discharge with a substrate heated to a temperature between 50° and 1000° C.

9. A dielectric film as defined in claim 8 wherein said silicon compound comprises an organo-silicone.

10. A dielectric film as defined in claim 9 wherein said organosilicone comprises plasma-polymerized hexamethyldisiloxane (PPHMDSO).

11. A dielectric film as defined in claim 9 wherein said organosilicone comprises plasma-polymerized hexamethyldisilazane (PPHMDSN).

12. A dielectric film as defined in claim 11 wherein said inorganic silicon compound is selected from the group of silicon nitride, silicon oxide or silicone oxynitride.

13. A dielectric film as defined in claim 8 wherein said silicon compound comprises an inorganic silicon compound.

14. A plasma-deposited silicon compound thin film dielectric material for use in a thin film capacitor, such film being produced in a glow discharge with a substrate heated to a temperature between 100° and 650° C.

15. A dielectric film as defined in claim 14 wherein the deposition frequency of the glow discharge is 2.45 GHz.

16. A dielectric film as defined in claim 14 wherein said silicon compound comprises an organosilicone.

17. A dielectric film as defined in claim 16 wherein said organosilicone comprises plasma polymerized hexamethyldisiloxane (PPHMDSO).

18. A dielectric film as defined in claim 16 wherein said organosilicone comprises plasma-polymerized hexamethyldisilazane (PPHMDSN).

19. A dielectric film as defined in claim 14 wherein said silicon compound comprises an inorganic silicon compound.

20. A thin film capacitor characterized in that said capacitor comprises a plasma-deposited silicon compound thin film dielectric material, such film being produced in a glow discharge with a substrate heated to a temperature in excess of 50° C.

21. A thin film capacitor as defined in claim 20 wherein said silicon compound comprises an organosilicone.

22. A thin film capacitor as defined in claim 21 wherein said organosilicone comprises plasma-polymerized hexamethyldisiloxane (PPHMDSO).

23. A thin film capacitor as defined in claim 21 wherein said organosilicone comprises plasma-polymerized hexamethyldisilazane (PPHMDSN).

24. A thin film capacitor as defined in claim 20 wherein said silicon compound comprises an inorganic silicon compound.

25. A thin film capacitor as defined in claim 24 wherein said inorganic silicon compound is selected from the group of silicon nitride, silicon oxide or silicon oxynitride.

* * * * *

UNITED STATES PATENT AND TRADEMARK OFFICE
CERTIFICATE OF CORRECTION

PATENT NO. : 4,599,678

DATED : July 8, 1986

INVENTOR(S) : Michael R. Wertheimer et al

It is certified that error appears in the above-identified patent and that said Letters Patent is hereby corrected as shown below:

Claim 6, line 1, change "5" to --7--.

Claim 7, line 1, change "1" to --2--.

Claim 12, line 1, change "11" to --13--.

Signed and Sealed this

Fifth Day of July, 1988

Attest:

DONALD J. QUIGG

Attesting Officer

Commissioner of Patents and Trademarks